US012534291B1

(12) United States Patent
Maddox

(10) Patent No.: US 12,534,291 B1
(45) Date of Patent: Jan. 27, 2026

(54) NESTING CONTAINER WITH INTEGRATED RECEPTACLE

(71) Applicant: Stephen Marston Maddox, Nashville, TN (US)

(72) Inventor: Stephen Marston Maddox, Nashville, TN (US)

( * ) Notice: Subject to any disclaimer, the term of this patent is extended or adjusted under 35 U.S.C. 154(b) by 0 days.

(21) Appl. No.: 19/046,427

(22) Filed: Feb. 5, 2025

(51) Int. Cl.
*B65F 1/06* (2006.01)

(52) U.S. Cl.
CPC .......... *B65F 1/062* (2013.01); *B65F 2220/12* (2013.01)

(58) Field of Classification Search
CPC .. B65F 1/062; B65F 1/067; B65F 1/06; B65F 1/00; B65F 2220/12
See application file for complete search history.

(56) References Cited

U.S. PATENT DOCUMENTS 3,300,082 A * 1/1967 Patterson ................ B65F 1/068 220/495.07
4,850,507 A * 7/1989 Lemongelli ............. B65F 1/062 220/495.07
5,632,401 A * 5/1997 Hurd ......................... B65F 1/16 220/531
2008/0083757 A1* 4/2008 Parker ..................... B65F 1/062 220/495.07
2009/0107998 A1* 4/2009 Meissen ................ B65F 1/1607 220/254.3

* cited by examiner

*Primary Examiner* — Javier A Pagan
(74) *Attorney, Agent, or Firm* — Holland & Knight LLP; Matthew C. Cox; Forrest S. Tinnin

(57) ABSTRACT

The present disclosure provides a container apparatus. The apparatus may include a container body. The container body may include a top, a bottom, and sidewalls spanning between the top and the bottom. The bottom and sidewalls may form an interior face and an exterior face, such that an enclosure is formed by the interior face. The apparatus may further include an inner ridge and a receptacle. The inner ridge may be defined on the interior face at the bottom. The receptacle may be formed by the inner ridge. The receptacle may thus be defined on a portion of the bottom within the enclosure. The inner ridge includes a hollow interior that forms an outer channel on the exterior face. The container body may be a trash can, and the receptacle may be shaped to receive a roll of trash bags.

18 Claims, 19 Drawing Sheets

NESTING CONTAINER WITH INTEGRATED RECEPTACLE

CROSS-REFERENCES TO RELATED APPLICATIONS

Not applicable.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to containers. More particularly, the present disclosure relates to trash cans.

Trash cans (including waste baskets, garbage cans, and the like) typically require a trash bag to be secured therein in order to receive and collect waste products. Such trash bags are often stored in a separate location, requiring additional work when a filled trash bag is removed form the trash can and a new trash bag is required. Conventional approaches to solving this issue may involve the attachment of a trash bag dispenser to such trash cans. However, such conventional workarounds typically prevent the trash cans from being nested, as is desirable for scenarios where multiple trash cans are empty and would otherwise be stored nested together in order to save space.

It would be advantageous to provide apparatuses and methods containers in order to solve the problems discussed above, including the deficiencies in typical workarounds.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a container apparatus. The apparatus may include a container body. The container body may include a top, a bottom, and sidewalls spanning between the top and the bottom. The bottom and sidewalls may form an interior face and an exterior face, such that an enclosure is formed by the interior face. The apparatus may further include an inner ridge and a receptacle. The inner ridge may be defined on the interior face at the bottom. The receptacle may be formed by the inner ridge. The receptacle may thus be defined on a portion of the bottom within the enclosure. In some embodiments, the inner ridge includes a hollow interior that forms an outer channel on the exterior face.

In some embodiments, the container body is a trash can, and the receptacle is shaped to receive a roll of trash bags.

In some embodiments, the inner ridge includes a first end disposed on the sidewalls and a second end disposed on the sidewalls, such that a region of the sidewalls is defined between the first end and the second end. The receptacle may be formed by the inner ridge and the region.

In some embodiments, the sidewalls include a corner formed between the first side and the second side. The first end may be disposed on the first side, and the second end may be disposed on the second side.

In some embodiments, the sidewalls include a corner formed between the first side and the second side. The region may extend across the corner.

In some embodiments, the inner ridge further defines a middle extending between the first end and the second end. The middle may be arcuate.

As mentioned above, the inner ridge may include the hollow interior that forms the outer channel on the exterior face. The outer channel may include a first window on the first side, a second window on the second side, and a third window on the bottom.

Another aspect of the present disclosure is a nester container assembly. The assembly may include a first container and a second container. Each of the first container and the second container may be provided in a fashion similar to the container apparatus discussed above. The first container may be positioned above and nested in the second container. For example, the outer channel of the first container may be shaped to receive the inner ridge of the second container.

Another aspect of the present disclosure is to provide a container body wherein a roll of trash bags fits entirely inside the container body inside the receptacle.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
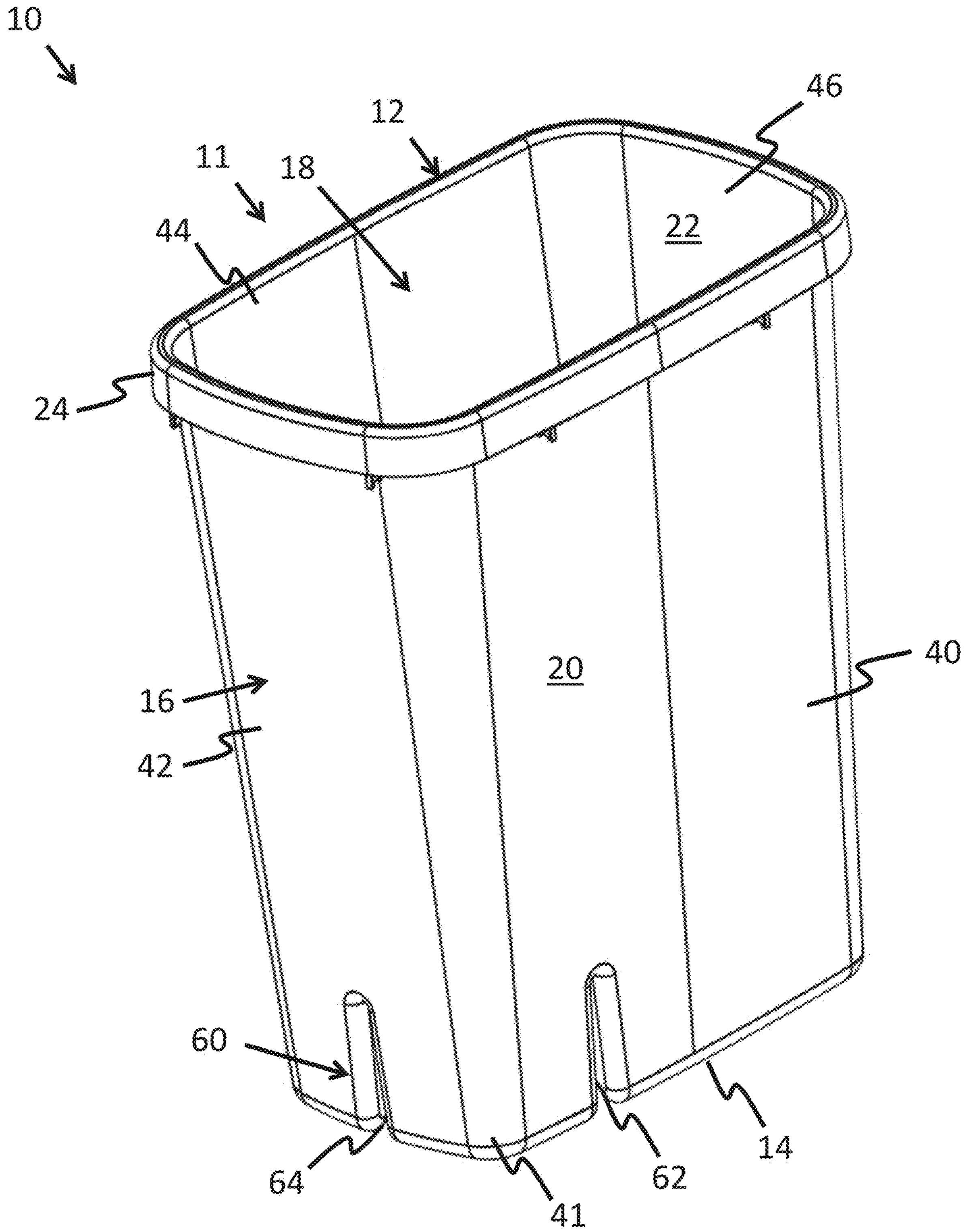
FIG. 1 is an upper perspective view of a container apparatus, according to some embodiments of the present disclosure.
Figure 2:
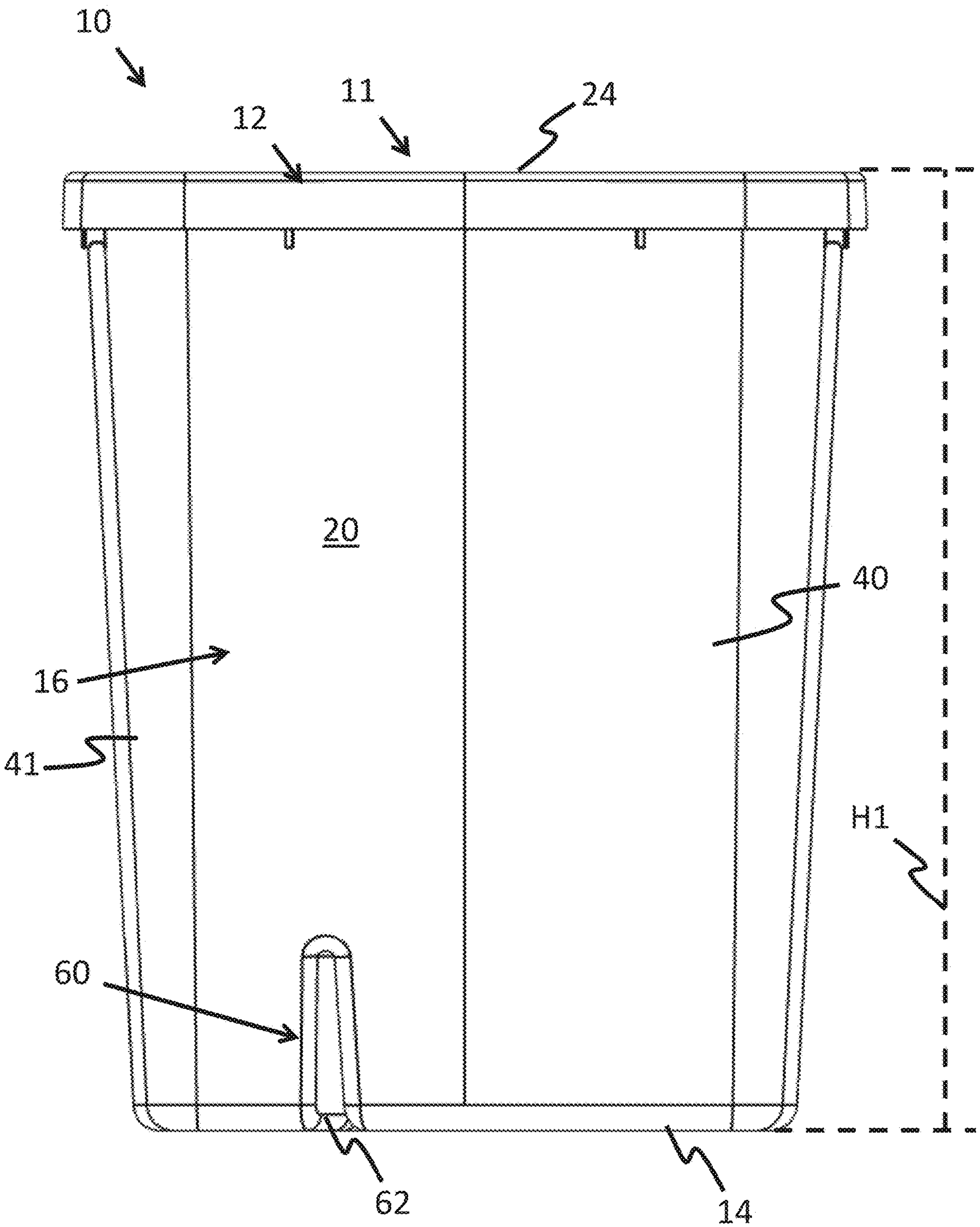
FIG. 2 is a first side view of a container apparatus, according to some embodiments of the present disclosure.
Figure 3:
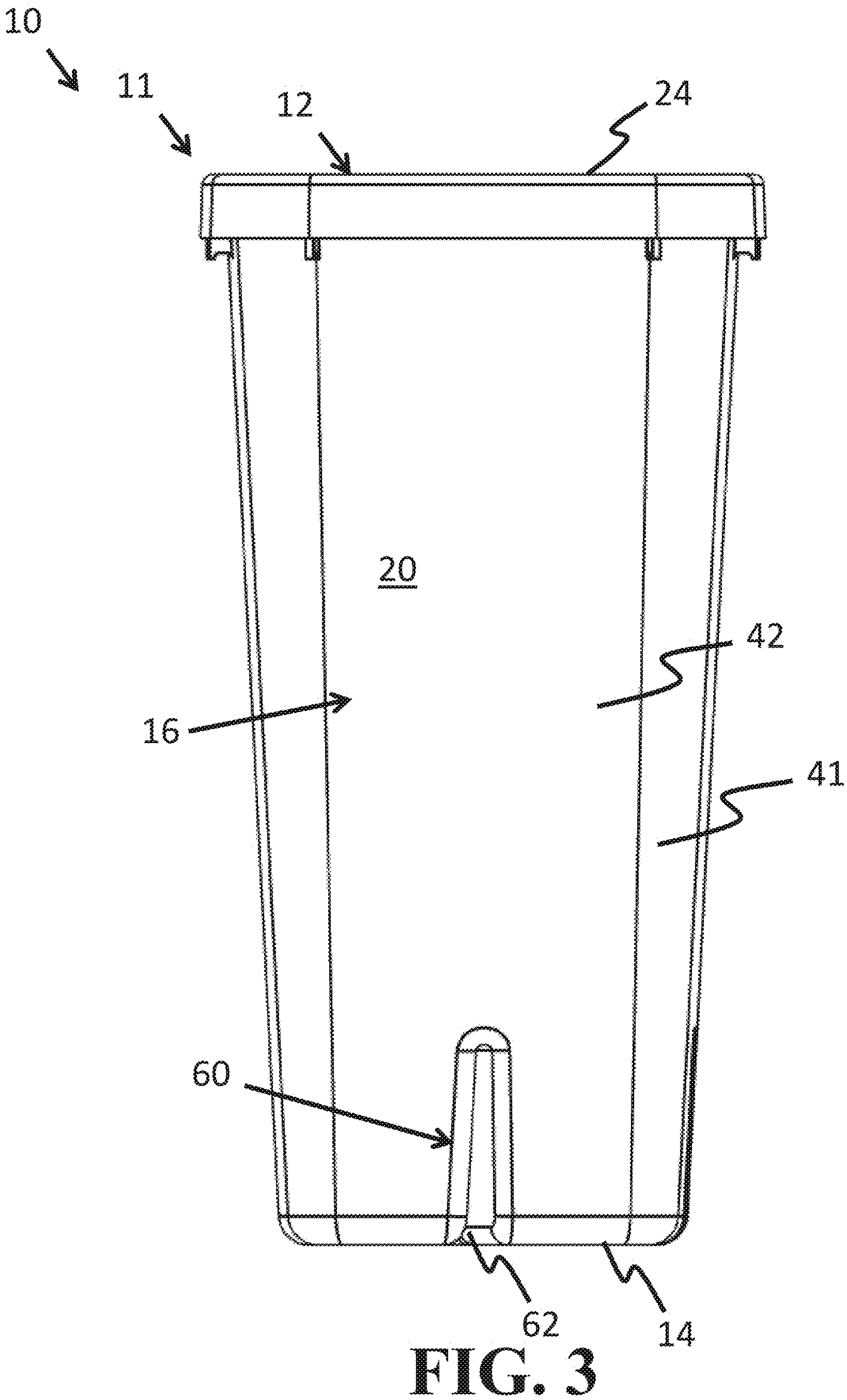
FIG. 3 is a second side view of a container apparatus, according to some embodiments of the present disclosure.

Referring now to FIGS. 1-3, a container apparatus ("apparatus") 10 is shown, according to various embodiments of the present disclosure. For instance, FIG. 1 depicts an upper perspective view the apparatus 10; FIG. 2 depicts a first side view of the of the apparatus 10; and FIG. 3 depicts a second side view of the apparatus 10, according to such embodiments. Depending on the implementation, the apparatus 10 may be a trash can. In other embodiments, the apparatus 10 is a waste basket, a bucket, a kitchen can or some other container suitable for implementing the advantages discussed herein.

The apparatus 10 may include a container body 11. In some embodiments, the container body 11 is a trash can. In other embodiments, the container body 11 is a waste basket. In other embodiments, the container body 11 is a bucket. In other embodiments still, the container body 11 is a container suitable for implementing the advantages discussed herein. In some embodiments, the apparatus 10 (or, rather, the container body 11) is provided as a unitary, one-piece structure. For example, the container body 11 may be made of plastic and may be manufactured in suitable fashions such as injection or rotation molding. In other embodiments, the container body 11 is provided as an assembly of two or more components. Of course, it should be appreciated that the container body 11 may be provided in any suitable fashion for achieving the advantages discussed herein.

In some embodiments, the container body 11 includes a top 12 (e.g., an open top end), a bottom 14 (e.g., a closed bottom face), and sidewalls 16 spanning between the top 12 and the bottom 14. The bottom 14 the and the sidewalls 16 may form an interior face 22 and an exterior face 20. In this sense, the an enclosure 18 may be formed by the interior face 22. In some embodiments, the apparatus 10 includes a rim 24 (e.g., a lip). For example, the rim 24 may extend outwards form the sidewalls 16 at the top 12. Accordingly, a trash bag or some other suitable waste capture member may be hung about the rim 24 and rest within the enclosure 18.

In some embodiments, a first height H1 of the apparatus 10 (or, rather, the container body 11, such as a vertical distance between the top 12 and the bottom 14) is approximately eighteen inches. In other embodiments, the first height H1 of the apparatus 10 is more than eighteen inches (e.g., twenty inches, twenty-four inches, thirty-two inches, etc.). In other embodiments still, the first height H1 of the apparatus 10 is less than eighteen inches (e.g., sixteen inches, twelve inches, etc.). It should be appreciated that the apparatus 10 may be provided with any first height H1 or other relevant dimension suitable for providing the advantages discussed herein.

Figure 4:
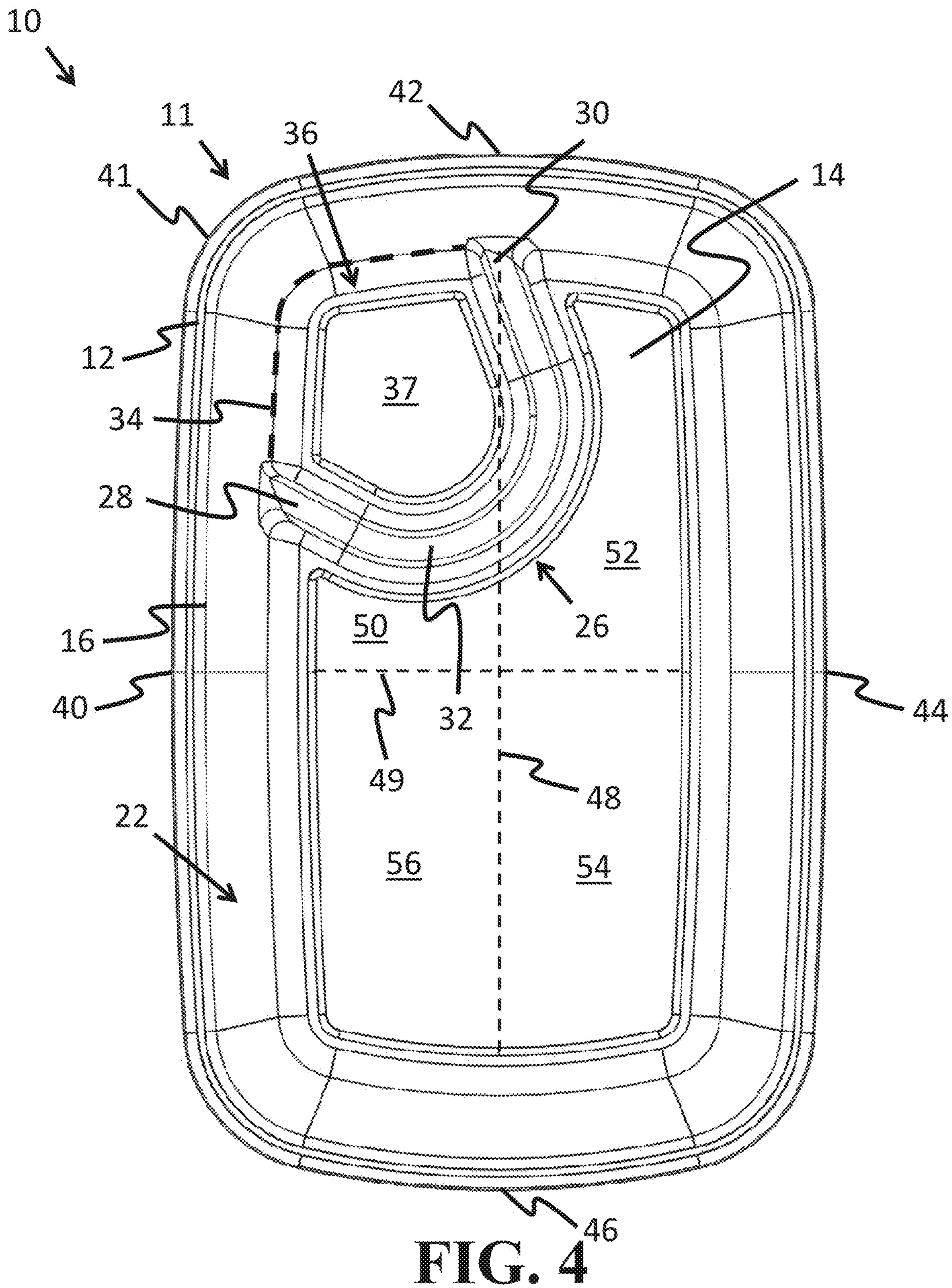
FIG. 4 is a top view of a container apparatus, according to some embodiments of the present disclosure.

Referring now to FIG. 4, a top view of the apparatus 10 is shown, according to some embodiments of the present disclosure. In some embodiments, container body 11 or, more particularly, the sidewalls 16 of the container body 11, includes a first side 40, a second side 42, a third side 44, and a fourth side 46. For example, the apparatus 10 may form a rectangular shape (from the perspective of the top view shown), such that the first side 40 is generally parallel to the third side 44, and the first and third sides 40, 44 are longer than the similarly parallel second and fourth sides 42, 44. Of course, the sidewalls 16 may be provided in any arrangement suitable to provide the advantages discussed herein (e.g., in a square fashion, in a circular fashion, in an elliptical fashion, etc.).

In some embodiments, the bottom 14 (or, more particularly, the interior face 22 on the bottom 14) defines a longitudinal midline 48 and a lateral midline 49 (from the perspective of the top view as shown). For example, the longitudinal midline 48 may be positioned halfway between the first and third sides 40, 44, and be generally parallel to the first and third sides 40, 44. Similarly, the lateral midline 49 may be positioned halfway between second and fourth sides 42, 46, and be generally parallel to the second and fourth sides 42, 46.

In some embodiments, the bottom 14 (or, more particularly, the interior face 22 on the bottom 14) defines a first quadrant 50 (e.g., an upper-left region), a second quadrant 52 (e.g., an upper-right region), a third quadrant 54 (e.g., a lower-right region), and a fourth quadrant 56 (e.g., a lower-left region). In this sense, the first, second, third, and fourth quadrants 50, 52, 54, 56 may be formed by the four regions on the bottom 14 defined by the sidewalls 16, the longitudinal midline 48, and the lateral midline 49.

In some embodiments, the apparatus 10 includes an inner ridge 26. The inner ridge 26 may be defined on the interior face 22 at the bottom 14. For example, the inner ridge 26 may extend upwardly from the bottom 14 (e.g., the interior face 22 on the bottom 14) within the enclosure 18. The inner ridge 26 may include a first end 28 and a second end 30. In some embodiments, the inner ridge 26 further includes a middle 32 extending between the first and second ends 28, 30. In some embodiments, the middle 32 is arcuate. In other embodiments, the middle ridge defines an angle between the first and second ends 28, 30. In other embodiments still, the middle 32 is straight.

In some embodiments, each of the first and second ends 28, 30 are disposed on the sidewalls 16. As a first example, the first end 28 may be disposed on the first side 40. As a second example, the second end 30 may be disposed on the second side 42. In other embodiments, the second end 30 is disposed on the first side 40. In other embodiments still, the second end 30 is disposed on the third side 44. In further embodiments, the second end 30 is disposed on the fourth side 46. In even further embodiments, the first and/or second ends 28, 30 are disposed on a corner between any of the first, second, third, and fourth sides 40, 42, 44, 46.

Depending on the implementation, the first end 28 may be disposed on the first side 40 within the first quadrant 50. Relatedly, the second end 30 may be disposed on the second side 42 within the first quadrant 50. In other embodiments, the second end 30 is disposed on the second side 42 within the second quadrant 52. In other embodiments still, and as shown, the second end 30 is disposed on the second side 42 at a location that spans the first and second quadrants 50, 52.

As mentioned above, the middle 32 of the inner ridge 26 may be arcuate. For example, from a longitudinal perspective, the middle 32 may extend from the first end 28, towards the lateral midline 49 (e.g., downwards), and then curve back towards the first side in order to extend to the second end 30. From a lateral perspective, the middle 32 may extend from the first end 28, towards the longitudinal midline 49, past the longitudinal midline 49, and back towards the longitudinal midline 49 in order to extend to the second end 30.

In some embodiments, the apparatus 10 (or, more particularly, the container body 11) includes a receptacle 36. As discussed in greater detail below, the receptacle 36 may be formed by the inner ridge 26. Generally, the receptacle 36 may be integrated with the outer profile of the sidewalls 16 and bottom 14, such that multiple apparatuses 10 may be nested in one another, as discussed in greater detail below with reference to FIGS. 15-19.

Figure 6:
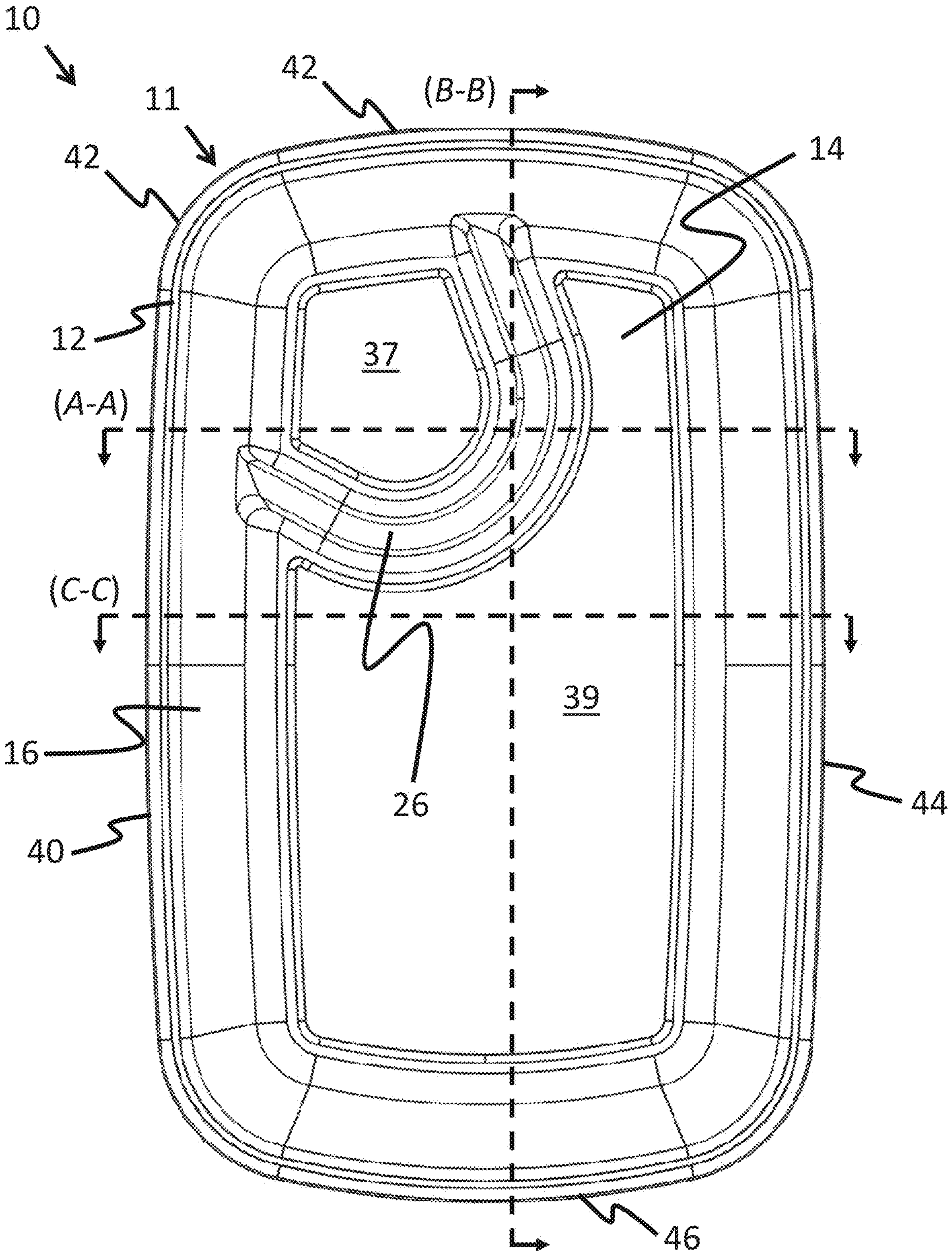
FIG. 6 is a top view of a container apparatus, according to other embodiments of the present disclosure.

In some embodiments, the receptacle 36 is defined on a portion of the bottom 14 within the enclosure 18. The receptacle 36 may be formed by the inner ridge 26, which may be defined on the interior face 22 at the bottom 14. For example, and as mentioned above, the first and second ends 28, 30 of the inner ridge 26 may be disposed on the sidewalls 16. Accordingly, the sidewalls 16 may include a region 34 defined between (e.g., extending along the interior face 22 on the sidewalls 16 between) the first and second ends 28, 30. The region 34 and the inner ridge 26 may thus form a particular housing within the enclosure 18. Thus, the receptacle 36 may be formed by the inner ridge 26 and the region 34 of the sidewalls 16. As shown, the receptacle 36 may form only a portion of the interior face 22 on the bottom 14. For example, the receptacle 36 may form a corner of the interior face 22 on the bottom 14 (e.g., about a corner 41). In this sense, and as shown with additional reference to FIG. 6, the interior face 22 on the bottom 14 may include a first component 37 and a second component 39. The first component 37 may be considered a receptacle component (e.g., the region of the interior face 22 on the bottom 14 within the receptacle 36), while the second component 39 may be considered a remaining component (e.g., the region of the interior face 22 on the bottom 14 outside the receptacle 36). In this sense, the inner ridge 26 may provide a barrier between the first and second components 37, 39.

As discussed in greater detail below with reference to FIGS. 9, 13, and 14 the receptacle may be shaped to receive an object 38. As mentioned above, the container body 11 may be a trash can. In this sense, the object 38 may be a roll of trash bags. In other embodiments, the object 38 is one or more cleaning supply items (e.g., a spray bottle, a brush, a roll of towels, etc.). In other embodiments still, the object 38 is a box of baking soda. In further embodiments, the object 38 includes a cup to hold any of the foregoing. It should be appreciated that the object 38 may be any suitable item for improving the maintenance and use of containers such as the container body 11. In turn, the inner ridge 26 and the receptacle 36 may be shaped in any manner appropriate for providing an enclosed region for receiving the object 38 as discussed herein. For instance, while generally depicted herein in an arcuate fashion, in further embodiments the receptacle 36 may form a square region, a triangular region, an elliptical region, a rectangular region, and so on.

In some embodiments, the receptacle 36 is positioned on the first quadrant 50. In other embodiments, the receptacle 36 is positioned on the first and second quadrants 50, 52. In other embodiments still, the receptacle region is positioned in one or more of the first, second, third, and fourth quadrants 50, 52, 54, 56 in any manner sufficient to provide an enclosed region appropriate for receiving the roll 38 as discussed herein. As mentioned above, the middle 32 of the inner ridge 26 may be arcuate. As suggested above, in further embodiments, the middle 32 of the inner ridge 26 is contoured in any manner appropriate for providing an enclosed region appropriate for receiving the object 38 as discussed herein.

Figure 5:
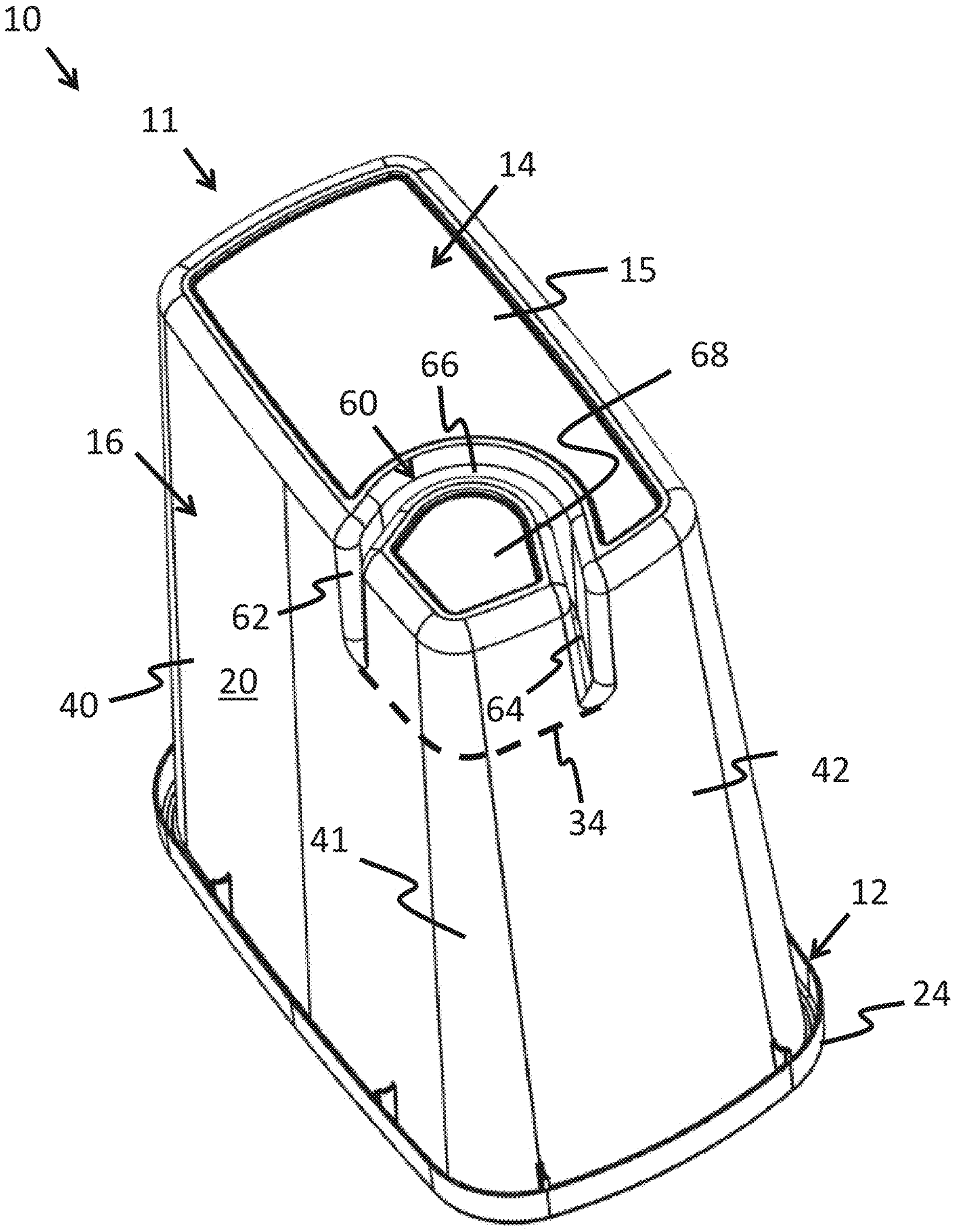
FIG. 5 is a lower perspective view of a container apparatus, according to some embodiments of the present disclosure.

Referring now to FIG. 5, a lower perspective view of the apparatus 10 is shown, according to some embodiments of the present disclosure. As mentioned above, the sidewalls 16 may include the region 34 which, in conjunction with the inner ridge 26, may form the receptacle 36. In some embodiments, the sidewalls 16 include the corner 41. For example, the corner 41 may be formed between the first and second sides 40, 42. Depending on the implementation, the region 34 may extend across or otherwise be formed by the corner 41. In some embodiments, the bottom 14 includes a recess 15 to enhance strength and stability.

In some embodiments, the inner ridge 26 includes a hollow interior that forms an outer channel 60 on the exterior face 20. For example, from the interior face 22 shown in the top perspective of the apparatus 10 with reference to FIG. 4, the inner ridge 26 may extend upwardly from the bottom 14 within the enclosure 18. In turn, from the perspective of the exterior face 20 shown, the hollow interior of the inner ridge 26 may form the channel 60. In this sense, the channel 60 may similarly extend upwardly from the bottom 14 into the enclosure 18.

In some embodiments, the channel 60 defines a first window 62, a second window 64, and a third window 66 on the exterior face 20 of the apparatus 10. The first window 62 may correspond to the first end 28 of the inner ridge 26. For example, due to the hollow formation of the inner ridge 26, the first window 62 may be defined where the first end 28 of the inner ridge 26 meets the first side 40 of the sidewalls 16. Thus, the first window 62 may be defined on the first side 40. In turn, the second window 64 may correspond to the second end 30 of the inner ridge 26. For example, due to the hollow formation of the inner ridge 26, the second window 64 may be defined where the second end 30 of the inner ridge 26 meets the second side 42. Thus, the second window 64 may be defined on the second side 42. In other embodiments, the second window 64 is defined on the first side 40. In other embodiments still, the second window 64 is defined on the third side 44. In further embodiments, the second window 64 is defined on the fourth side 46. In even further embodiments, the first and/or second windows 62, 64 are defined on a corner between any of the first, second, third, and fourth sides 40, 42, 44, 46.

As shown, the first and second windows 62, 64 may be disposed on the bottom 14 (e.g., on the exterior face 20 on the bottom 14) and span partially towards the top 12 along the sidewalls 16. The third window 66 may correspond to the middle 32 of the inner ridge 26. Thus, the third window may be defined on the bottom 14 (e.g., on the exterior face 20 on the bottom 14). As mentioned above, the middle 32 of the inner ridge 26 may be arcuate. In turn, the third window 64 may follow this arcuate shape. Generally, of course, the third window 66 may extend between the first and second windows 62, 64.

Figure 7:
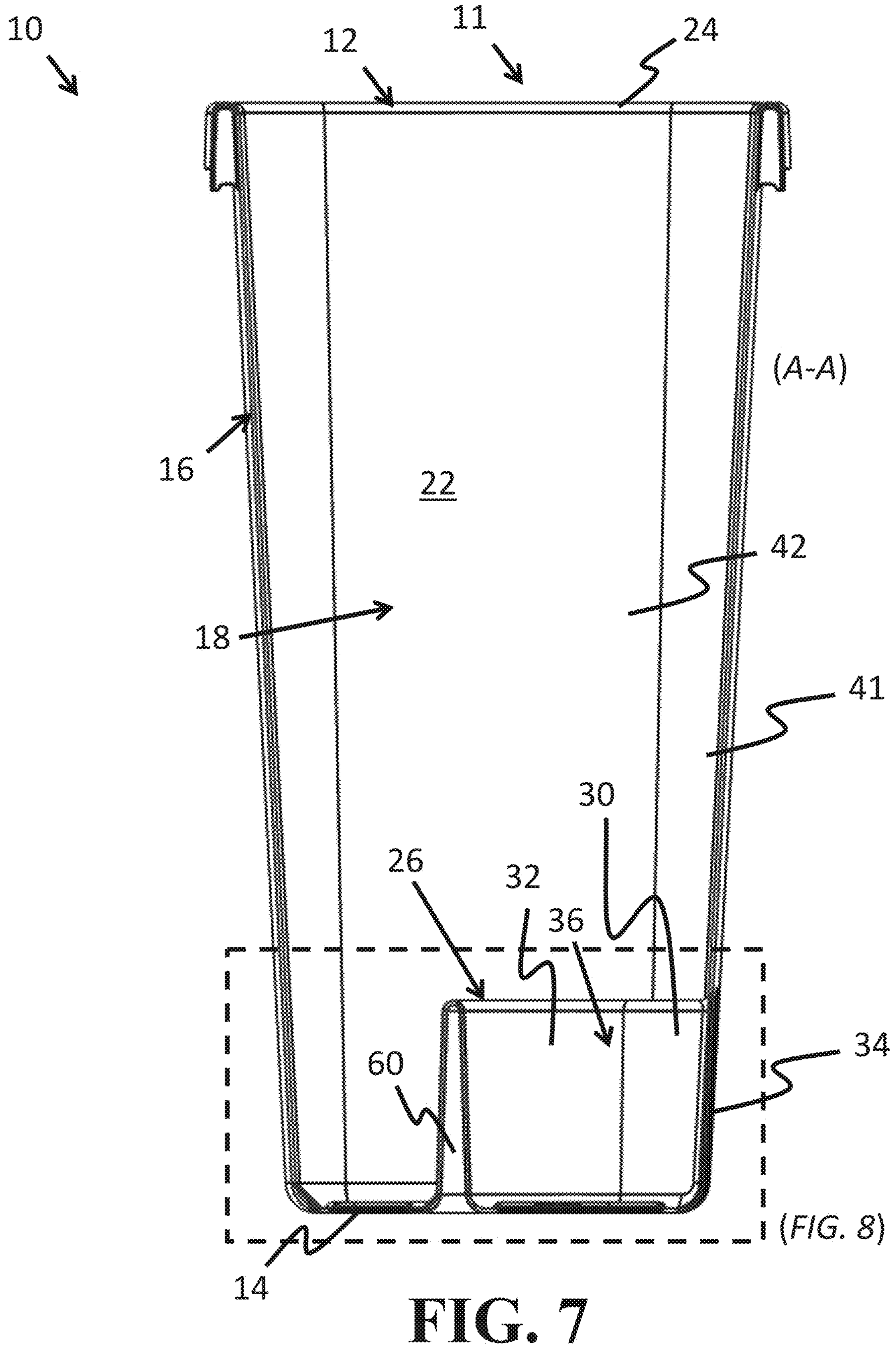
FIG. 7 is a first cross-sectional view of a container apparatus, according to some embodiments of the present disclosure.
Figure 8:
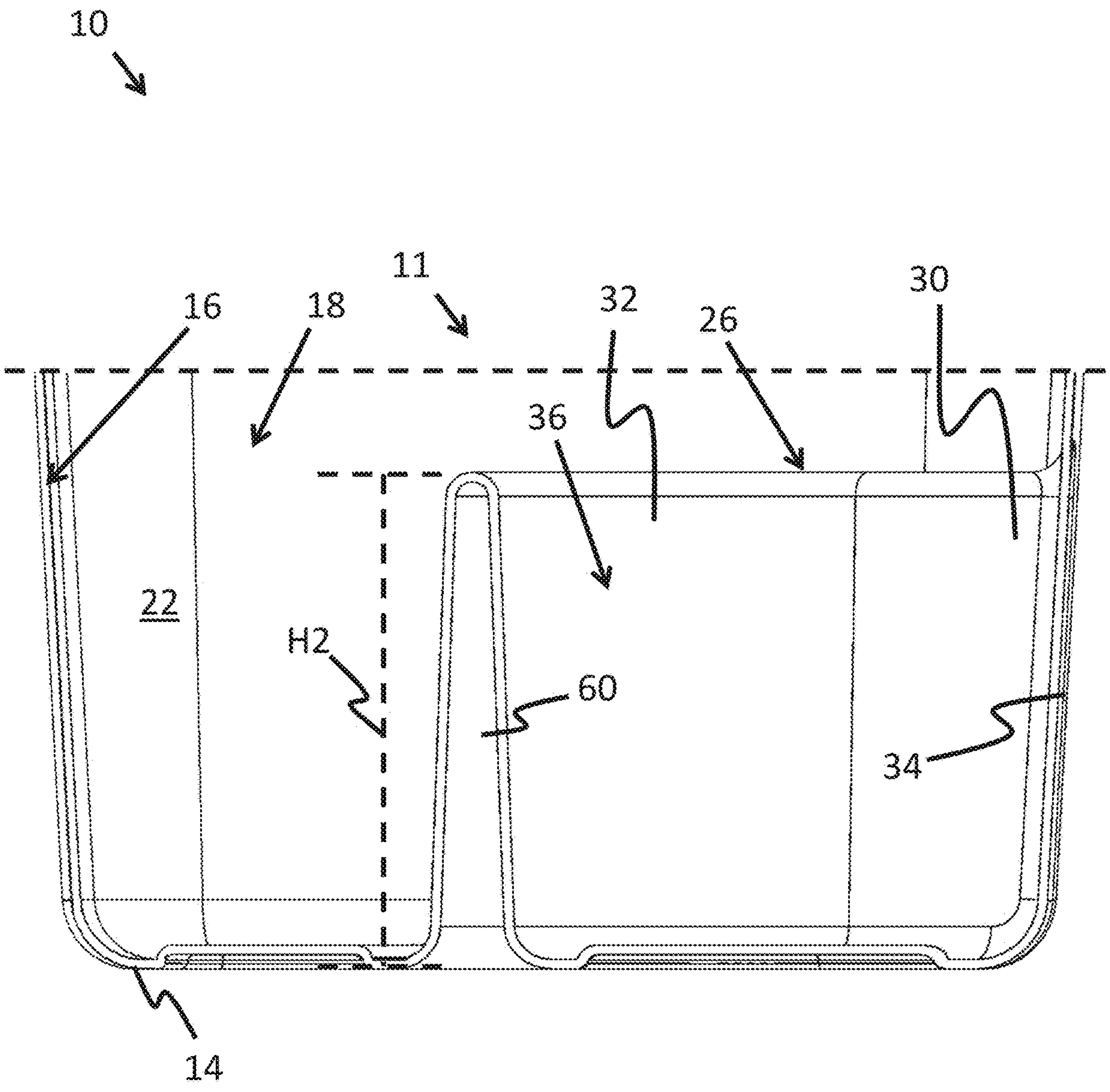
FIG. 8 is a detailed partial view of the apparatus of FIG. 7, according to some embodiments of the present disclosure.
Figure 9:
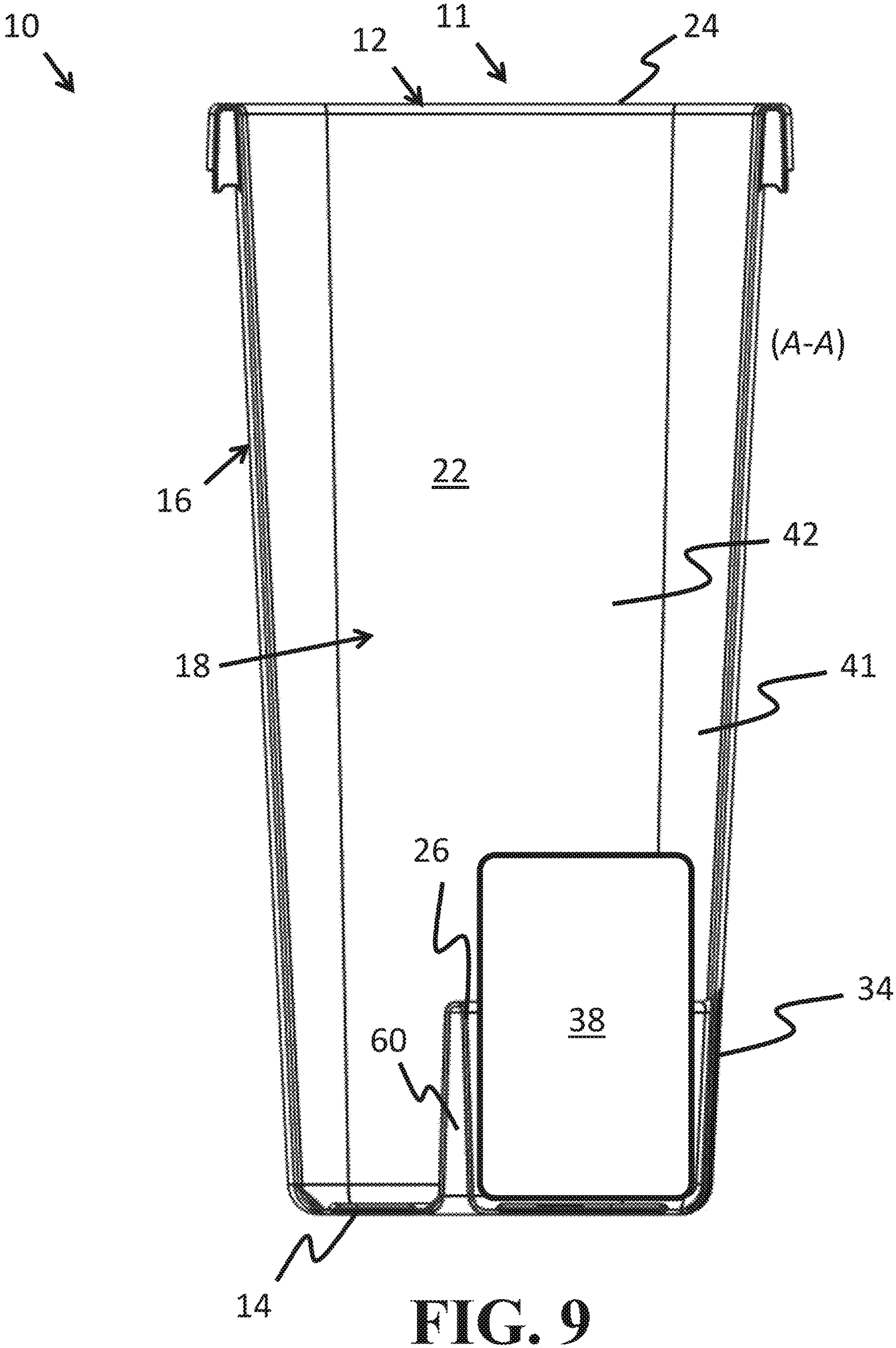
FIG. 9 is a cross-sectional view the apparatus of FIG. 7 holding an item in a receptacle, according to some embodiments of the present disclosure.
Figure 10:
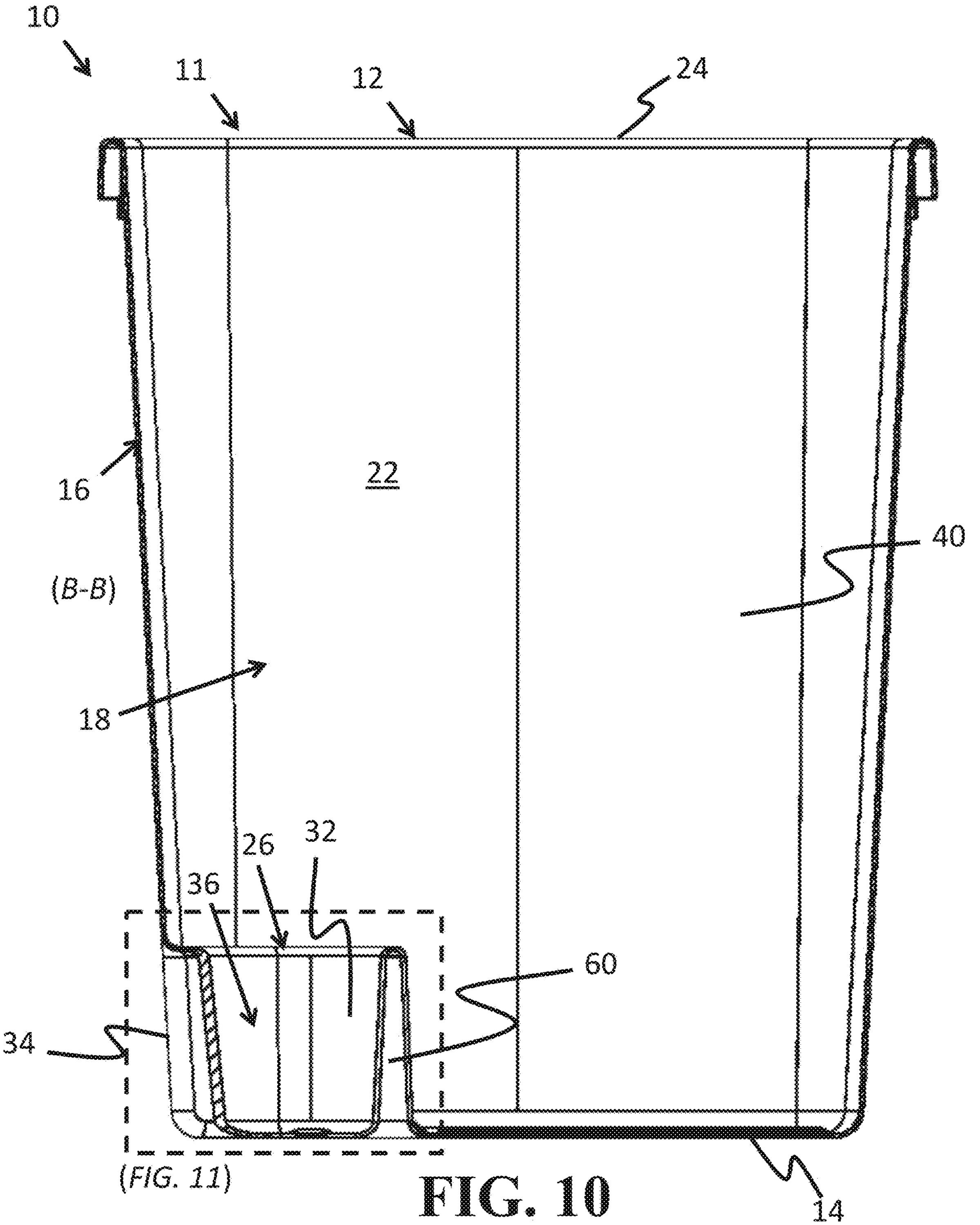
FIG. 10 is a second cross-sectional view of a container apparatus, according to some embodiments of the present disclosure.
Figure 11:
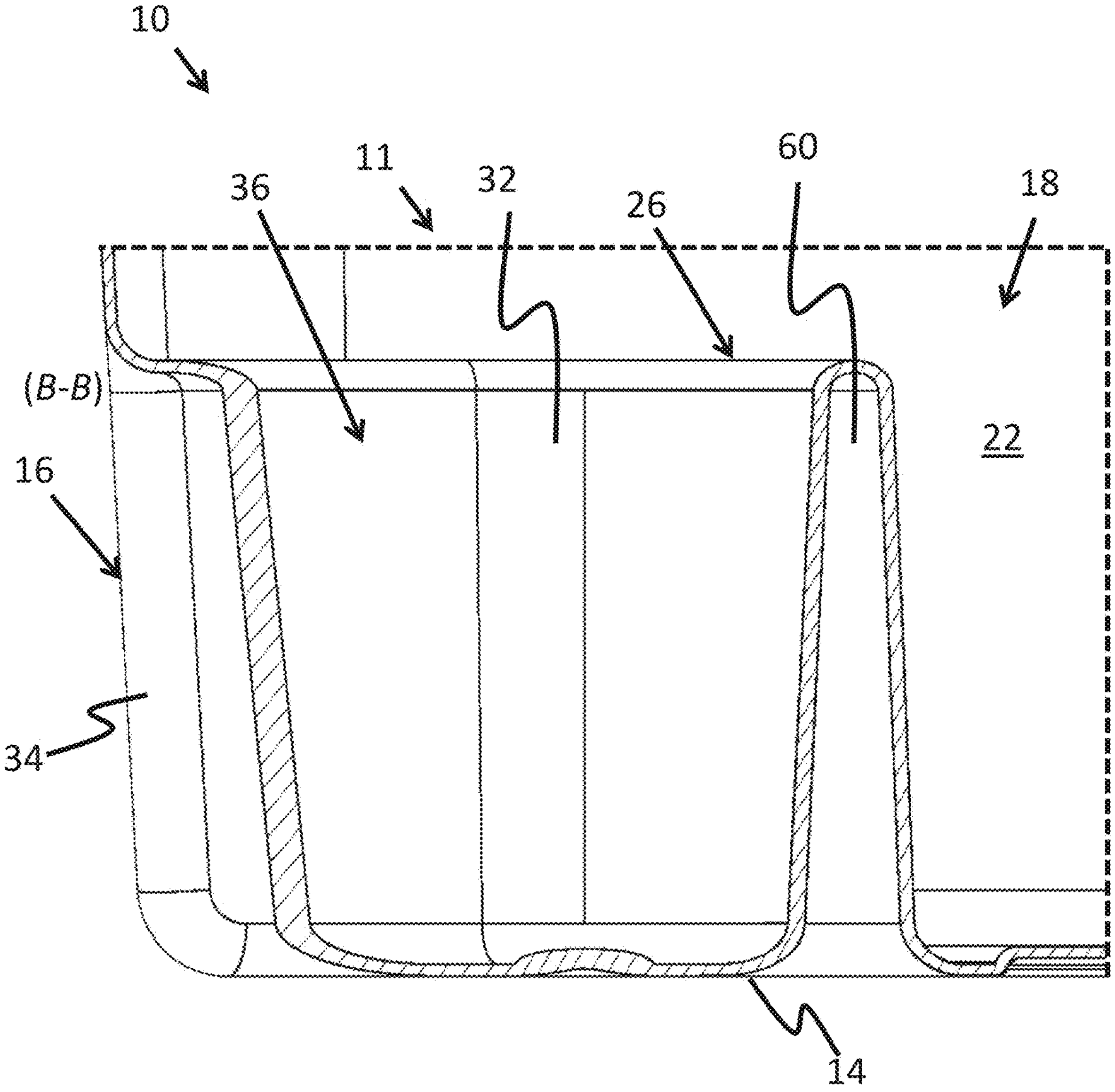
FIG. 11 is a detailed partial view of the apparatus of FIG. 10, according to some embodiments of the present disclosure.
Figure 12:
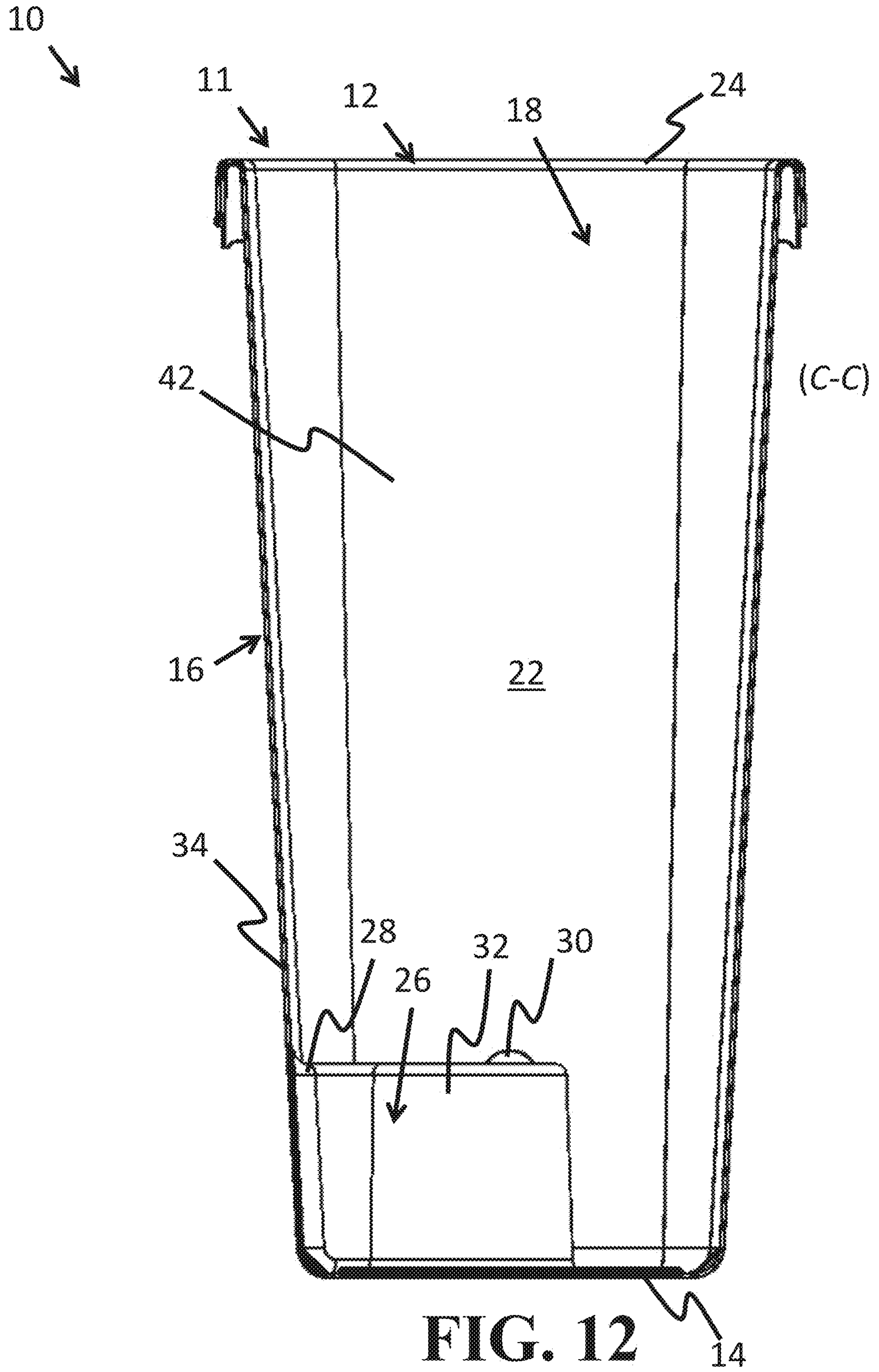
FIG. 12 is a third cross-sectional view of a container apparatus, according to some embodiments of the present disclosure.
Figure 13:
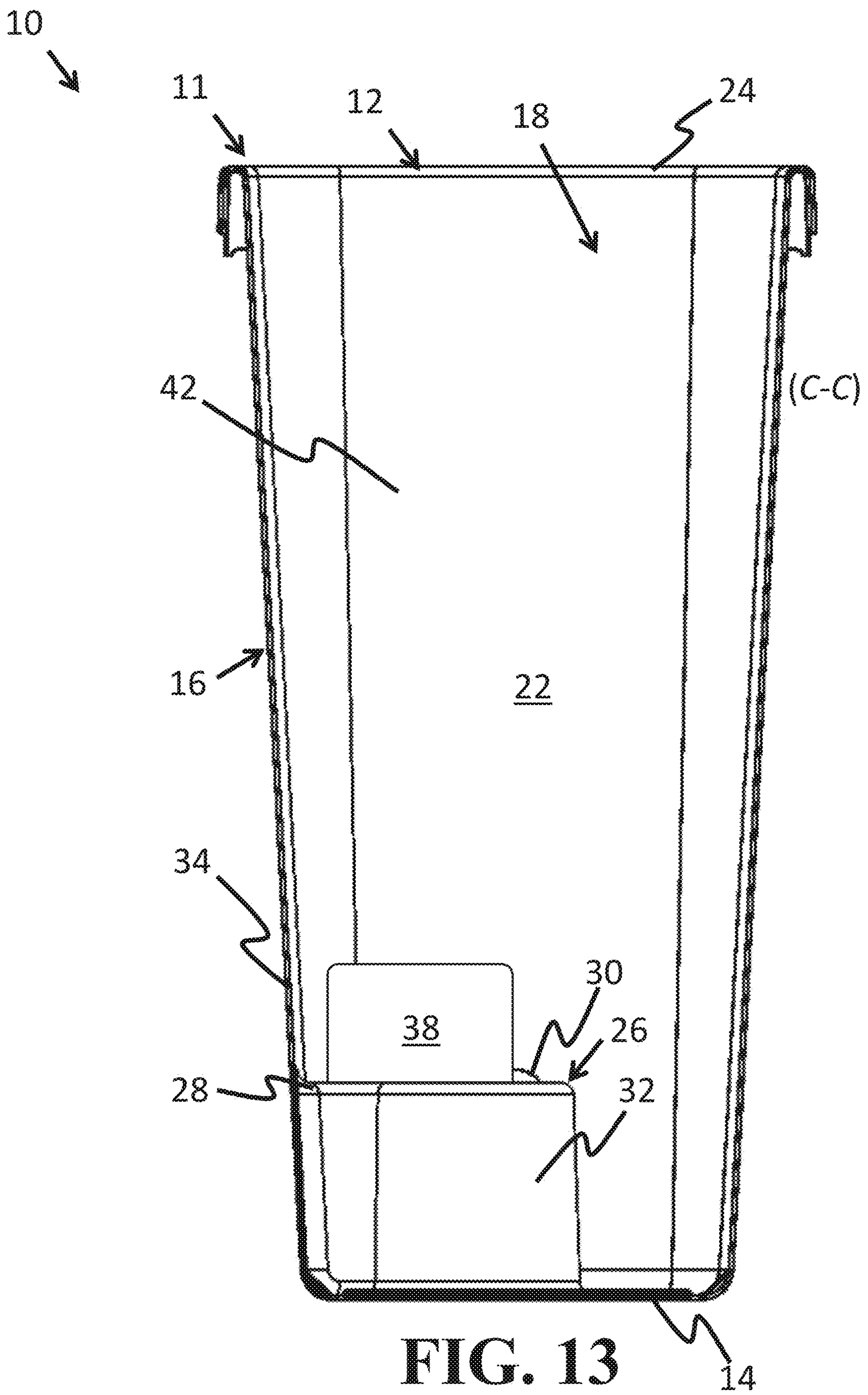
FIG. 13 is a cross-sectional view the apparatus of FIG. 12 holding an item in a receptacle, according to some embodiments of the present disclosure.
Figure 14:
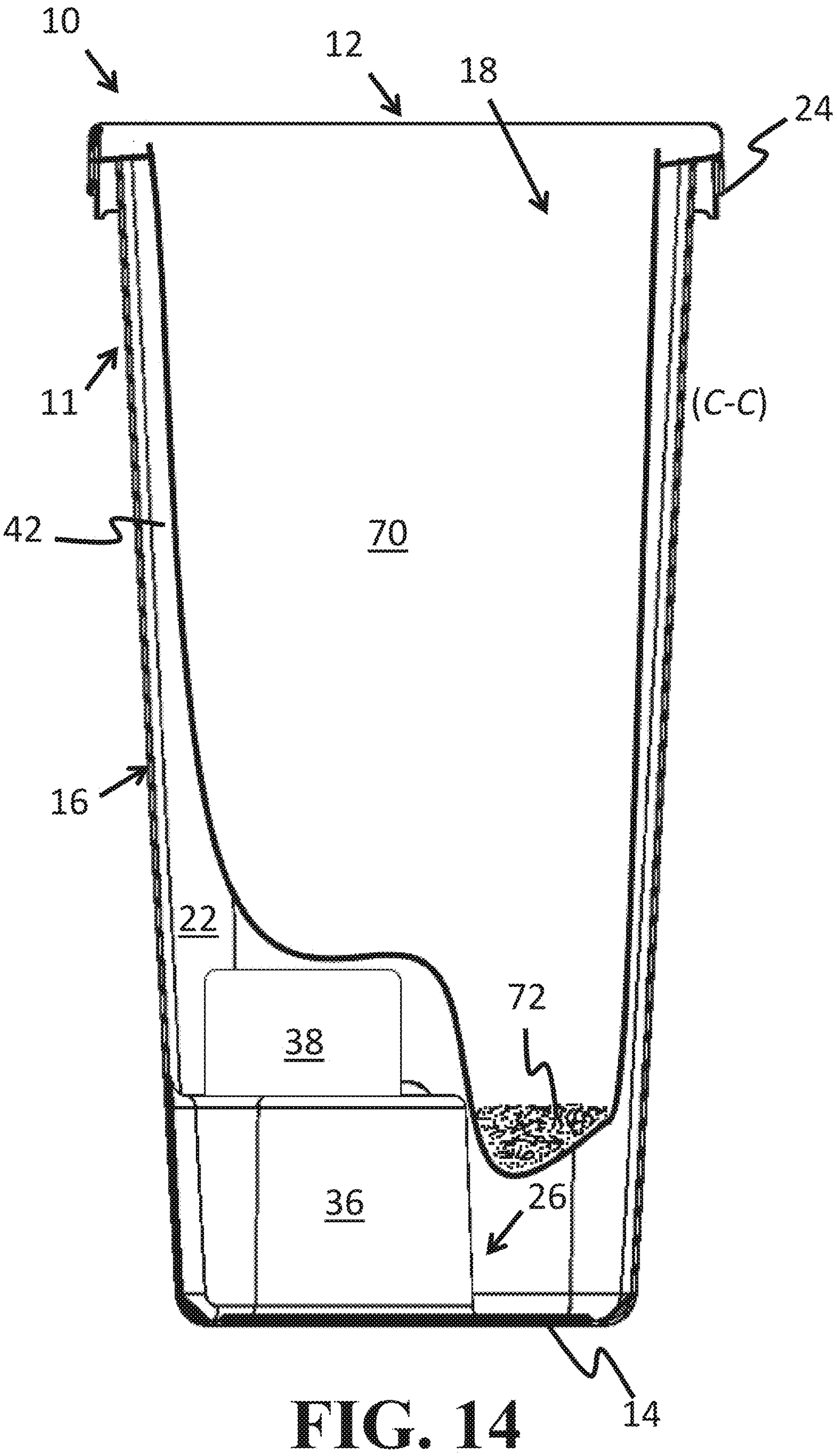
FIG. 14 is a cross-sectional view of the apparatus of FIG. 12 holding a trash bag and an object in a receptacle, according to some embodiments of the present disclosure.
Figure 15:
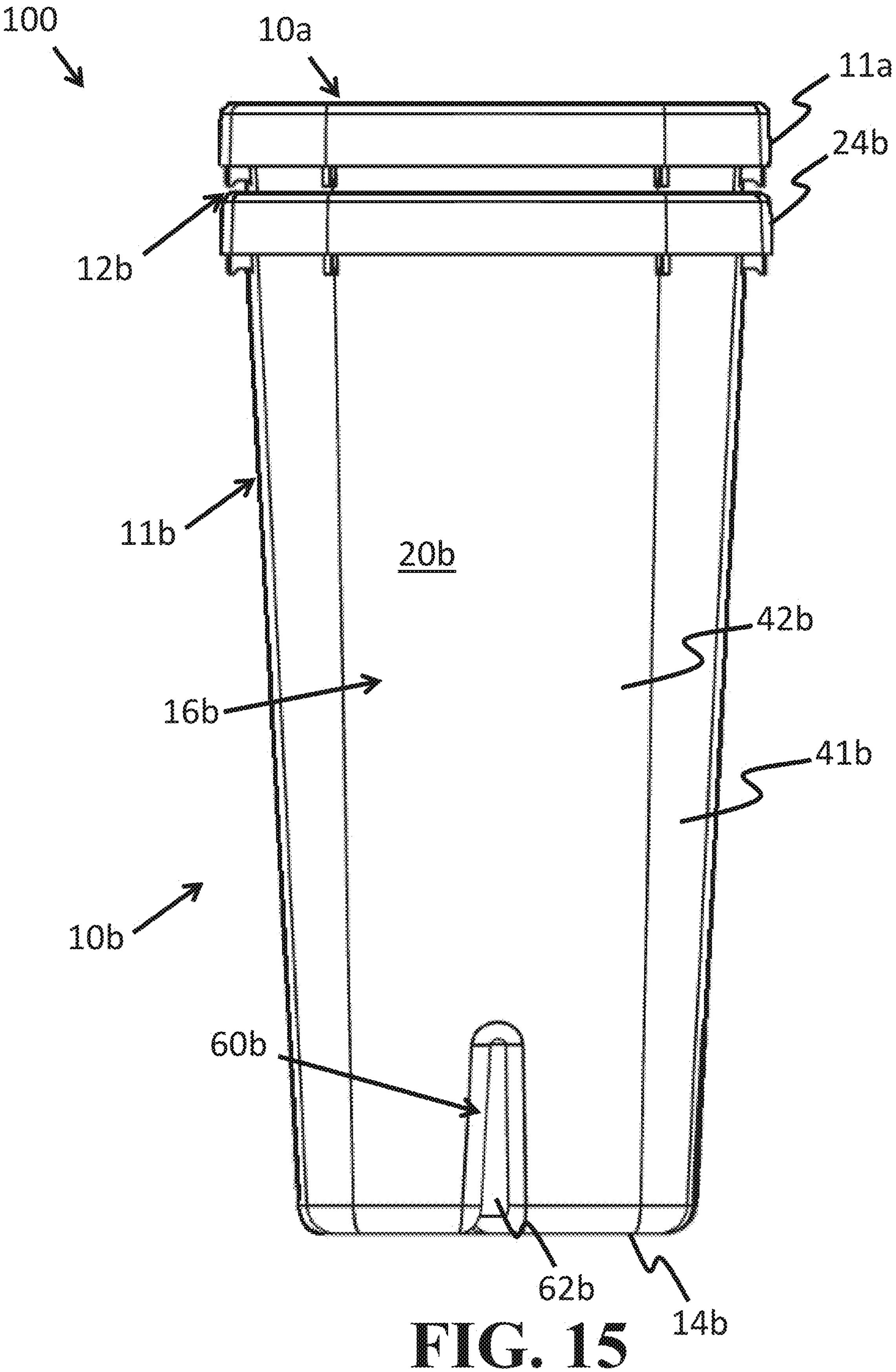
FIG. 15 is a first side view of a nested container assembly, according to some embodiments of the present disclosure.
Figure 16:
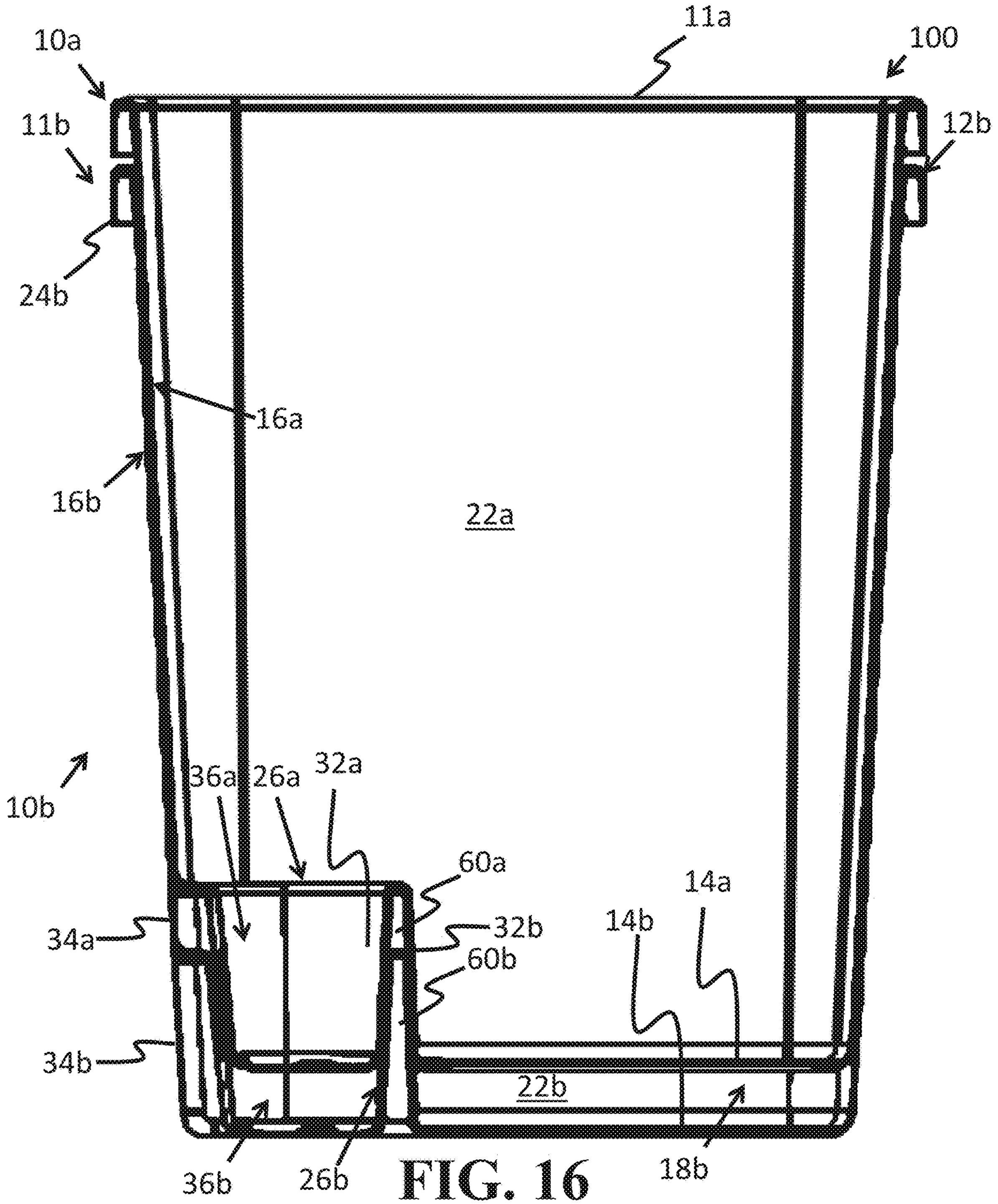
FIG. 16 is a cross sectional view of the assembly of FIG. 14, according to some embodiments of the present disclosure.
Figure 17:
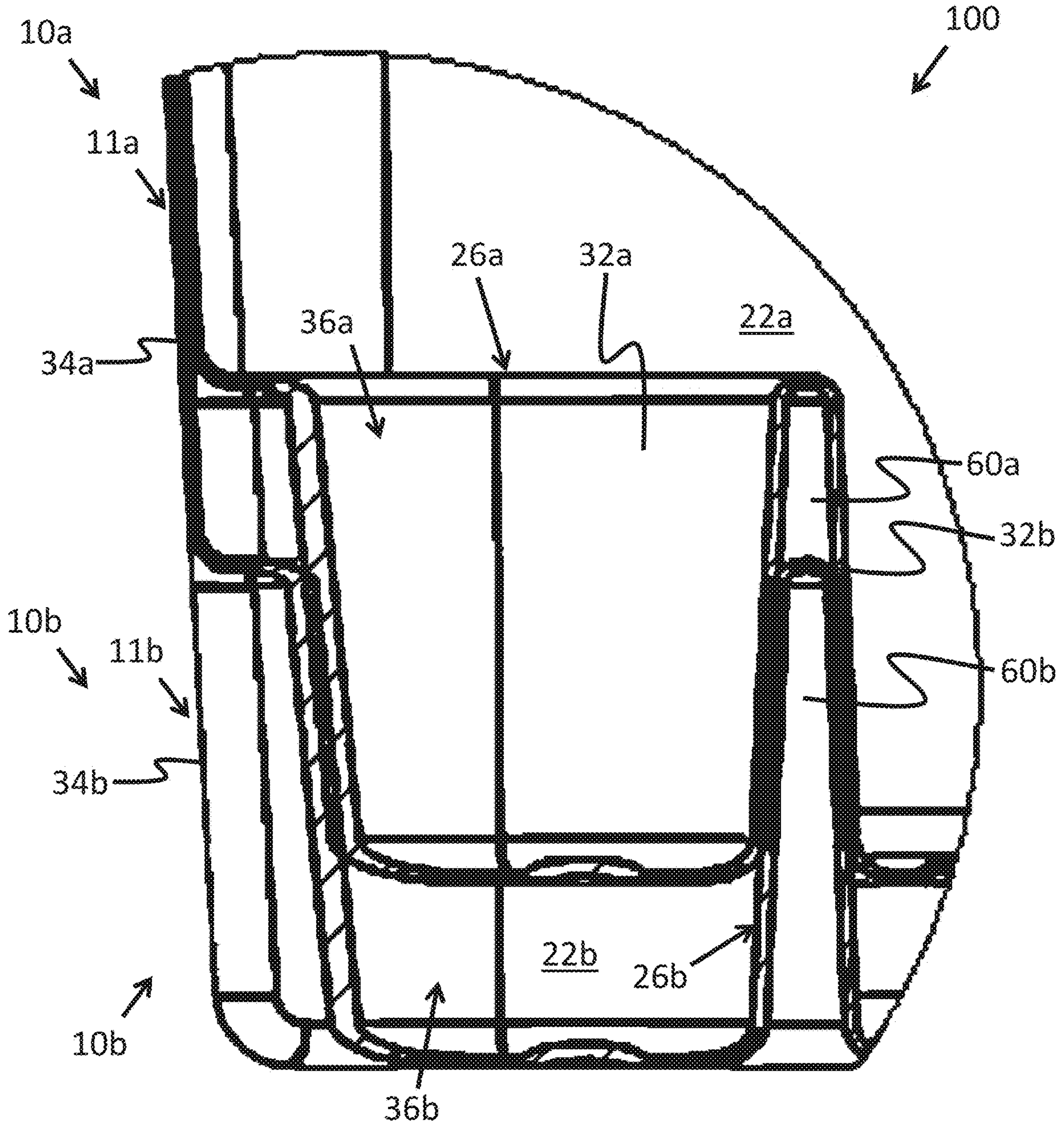
FIG. 17 is a detailed partial view of the assembly of FIG. 15, according to some embodiments of the present disclosure.
Figure 18:
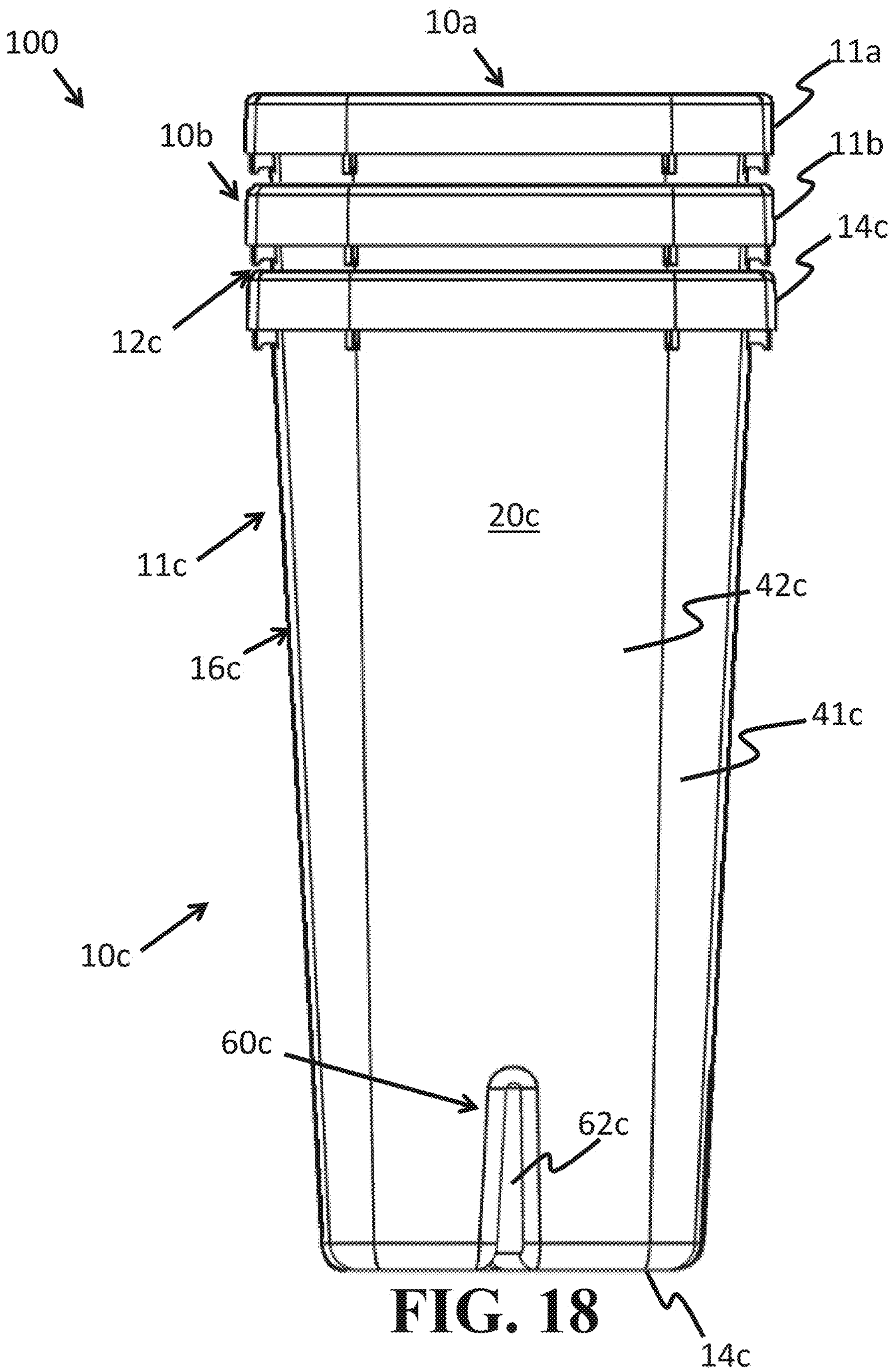
FIG. 18 is a first side view of a nested container assembly, according to other embodiments of the present disclosure.
Figure 19:
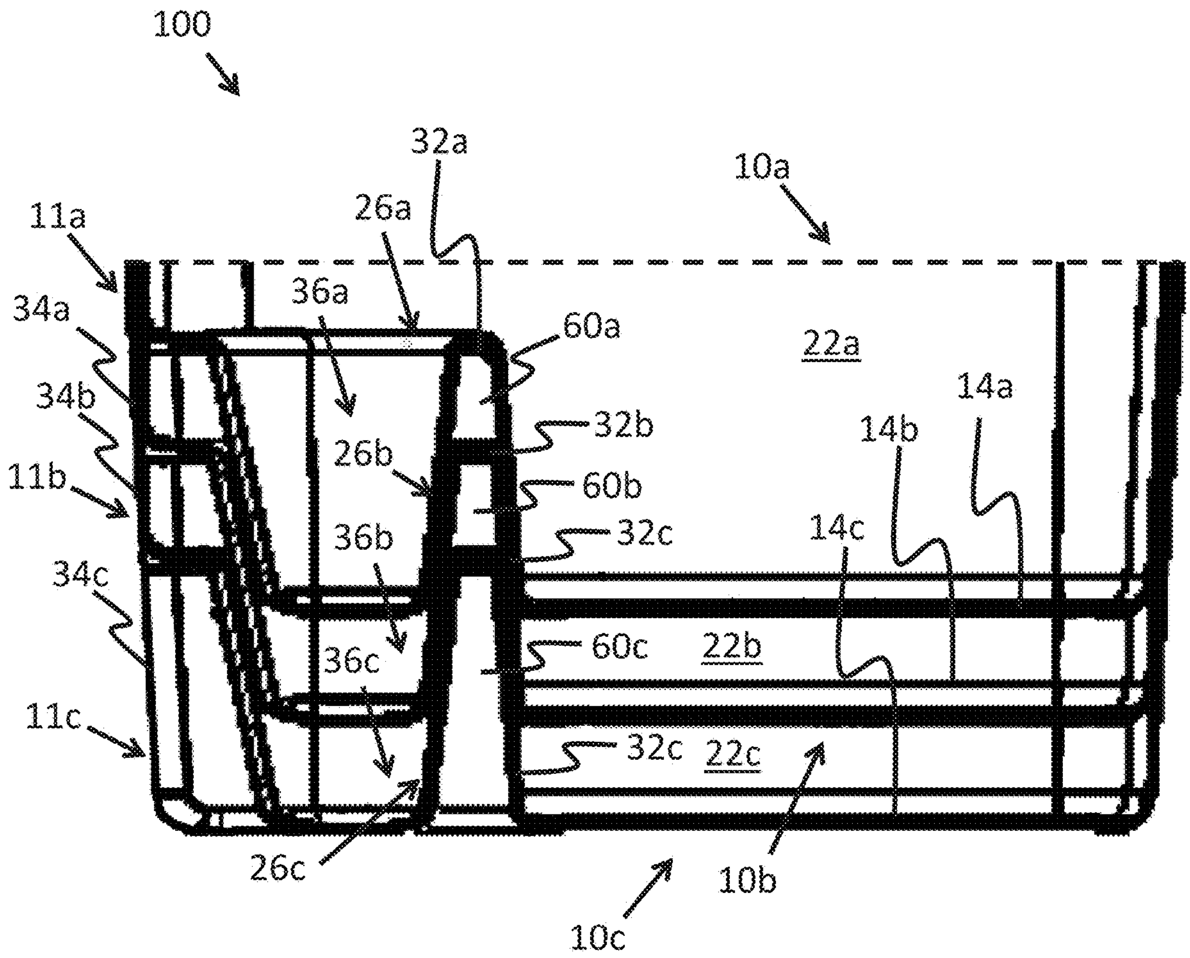
FIG. 19 is a detailed partial view of the assembly of FIG. 17, according to some embodiments of the present disclosure.

Referring now to FIGS. 6-14, cross-sectional views of the apparatus 10 are shown, according to various embodiments of the present disclosure. For instance, FIGS. 7-9 show the cross-sectional view A-A identified in FIG. 6; FIGS. 10 and 11 show the cross-sectional view B-B identified in FIG. 6; and FIGS. 12-14 show the cross-sectional view C-C identified in FIG. 6. As shown with particular reference to FIGS. 9 and 13, and as mentioned above, the receptacle 36 may be shaped to receive the object 38, which may be a roll of trash bags. In some embodiments the roll of trash bags fits entirely inside the container.

Referring particularly to FIG. 14, the apparatus 10 is shown holding a trash bag 70 within the enclosure 18. For instance, the trash bag 70 may be hung about the rim 24. In some embodiments, the sidewalls 16 may be tall enough such that the trash bag 70 hangs above and does not make contact with the object 38 (e.g., the roll of trash bags). In other embodiments, and as shown, the trash bag 70 may rest on the object 38, such that a portion of the trash bag 70 hangs free of the object 38 and the receptacle 36 holding the object 38. Advantageously, when the trash bag 70 rests on the object 38 with a portion hanging free as shown, any fluids 72 in the trash bag 70 will flow to the portion of the trash bag 70 hanging free of the object 38 (e.g., over the second component 39 depicted with reference to FIG. 6, as opposed to the first component 37 defined by the receptacle 36).

Referring particularly to FIG. 8, a second height H2 of the inner ridge 26 (e.g., a distance by which the inner ridge 26 extends upwardly from the bottom 14) is a portion of the first height H1 of the container body 11. As a first example, the second height H2 may be one tenth of the first height H1. As a second example, the second height H2 may be one eighth of the first height H1. As a third example, the second height H2 may be one sixth of the first height H1. As a fourth example, the second height H2 may be one fifth of the first height H1. As a fifth example, the height H2 may be one fourth of the first height H1. As a sixth example, the second height H2 may be one third of the first height H1. As a seventh example, the second height H2 may be one half of the first height H1. In further embodiments, the second height H2 is some portion of the first height H1 between any of the aforementioned values. It should be appreciated that the inner ridge 26 may be provided with any second height H2 or other dimension suitable for providing the advantages discussed herein.

Referring now to FIGS. 15-19, a nested container assembly ("assembly") 100 is shown, according to some embodiments of the present disclosure. In some embodiments, the assembly 100 includes the apparatus 10, which for the purposes of the assembly 100 may be considered a "first container 10*a*." Additionally, the assembly 100 may further include a second container 10*b*, which may be provided in the same fashion as the apparatus 10 discussed above. Further, the assembly 100 may further include an third container 10*b*, which may be provided in the same fashion as the apparatus 10 discussed above. For the purpose of the assembly 100, the first container 10*a* may include all of the components of the apparatus 10 discussed above, each such component denoted with an "a"; the second container 10*b* may include all of the components of the apparatus 10 discussed above, each such component denoted with a "b"; and the third container 10*c* may include all of the components of the apparatus 10 discussed above, each such component denoted with a "c."

Accordingly, the assembly 100 may include the first container 10*a* and the second container 10*b*, each of which may include the container body 11 having the top 12, the bottom 14, and the sidewalls 16 spanning between the top 12 and the bottom 14 forming the interior face 22 and the exterior face 20, such that the enclosure 18 is formed by the interior face 22. In turn, each of the first and second containers 10*a*, 10*b* may include the inner ridge 26 defined on the interior face 22 at the bottom 14, the inner ridge 26 including a hollow interior that forms the outer channel 60 on the exterior face 20. The apparatus 100 may further include the third container 10*c* in a fashion discussed above with respect to the second container 10*b*. Of course, it should be appreciated that the assembly 100 may include any number of nested containers fashioned similar to the apparatus 10.

As suggested above, the assembly 100 may be a nested assembly of containers. Accordingly, the first container 10*a* may be nested within the second container 10*b*, the second container 10*b* may be nested within the third container 10*c*, and so on. For example, the first container 10*a* may be positioned above and nested in the second container 10*b*. In order to provide such nesting, the sidewalls 16 of the apparatus 10 may be angled inwards from the top 12 to the bottom 14, such that the first container 10*a* may be nested in the second container 10*b*, and so on. As discussed in greater detail below, because the inner ridge 26 of the apparatus 10 is hollow (defining the outer channel 60) and positioned within the perimeter of the bottom 14, the profiles of the respective bottoms 14*a* and 14*b* of the first and second containers 10*a*, 10*b* may match in a fashion that is suitable to facilitate such nesting, along with any additional containers included in the assembly 100, such as the third container 10*c*.

As suggested above, the inner ridge 26 and corresponding outer channel 60 of the apparatus 10 may be configured to facilitate such nesting appropriate for the assembly 100. In this sense, the inner ridge 26 and the outer channel 60 may be positioned within the outer perimeter of the sidewalls 16, and an outer profile of the inner ridge 26 may correspond to the inner profile of the outer channel 60. Accordingly, the outer channel 60*a* of the first container 10*a* may be shaped to receive the inner ridge 26*b* of the second container 10*b*. In turn, the outer channel 60*b* of the second container 10*b* may be shaped to receive the inner ridge 26*c* of the third container 10*c*, and so on.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Thus, although there have been described particular embodiments of the present invention of a new and useful NESTING CONTAINER WITH INTEGRATED RECEPTACLE, it is not intended that such references to particular embodiments be construed as limitations upon the scope of this invention.

What is claimed is:

1. A container apparatus, comprising:

a container body including a top, a bottom, and sidewalls spanning between the top and the bottom, the bottom and sidewalls forming an interior face and an exterior face, such that an enclosure is formed by the interior face; and a receptacle defined on a portion of the bottom within the enclosure, the receptacle formed by an inner ridge defined on the interior face at the bottom, wherein the inner ridge includes a first end disposed on the sidewalls and a second end disposed on the sidewalls, such that a region of the sidewalls is defined between the first end and the second end, and wherein the receptacle is formed by the inner ridge and the region.

2. The apparatus of claim 1, wherein the container body is a trash can, and wherein the receptacle is shaped to receive a roll of trash bags.

3. The apparatus of claim 1, wherein the sidewalls include a first side and a second side, wherein the first end is disposed on the first side, and wherein the second end is disposed on the second side.

4. The apparatus of claim 3, wherein the sidewalls include a corner formed between the first side and the second side, and wherein the region extends across the corner.

5. The apparatus of claim 4, wherein the inner ridge further defines a middle extending between the first end and the second end, and wherein the middle is arcuate.

6. The apparatus of claim 5, wherein the inner ridge includes a hollow interior that forms an outer channel on the exterior face.

7. The apparatus of claim 6, wherein the outer channel includes a first window on the first side, a second window on the second side, and a third window on the bottom.

8. A container apparatus, comprising:

a container body including a top, a bottom, and sidewalls spanning between the top and the bottom, the bottom and sidewalls forming an interior face and an exterior face, such that an enclosure is defined within the interior face;

an inner ridge defined on the interior face at the bottom, the inner ridge including a hollow interior that forms an outer channel on the exterior face; and a receptacle formed by the inner ridge, wherein the inner ridge includes a first end disposed on the sidewalls and a second end disposed on the sidewalls, such that a region of the sidewalls is defined between the first end and the second end, and wherein the receptacle is formed by the inner ridge and the region.

9. The apparatus of claim 8, wherein the container body is a trash can, and wherein the receptacle is shaped to receive a roll of trash bags.

10. The apparatus of claim 8, wherein the sidewalls include a first side and a second side, wherein the first end is disposed on the first side, and wherein the second end is disposed on the second side.

11. The apparatus of claim 10, wherein the sidewalls include a corner formed between the first side and the second side, and wherein the region extends across the corner.

12. The apparatus of claim 11, wherein the inner ridge further defines a middle extending between the first end and the second end, and wherein the middle is arcuate.

13. The apparatus of claim 8, wherein the sidewalls include a first side and a second side, and wherein the outer channel includes a first window on the first side, a second window on the second side, and a third window on the bottom.

14. A nested container assembly, comprising:

a first container and a second container, each of the first container and the second container including:

a container body having a top, a bottom, and sidewalls spanning between the top and the bottom, the bottom and sidewalls forming an interior face and an exterior face, such that an enclosure is formed by the interior face; and an inner ridge defined on the interior face at the bottom, the inner ridge including a hollow interior that forms an outer channel on the exterior face, wherein the first container is positioned above and nested in the second container, wherein the outer channel of the first container is shaped to receive the inner ridge of the second container, wherein each of the first container body and the second container body further include:

a first end of the inner ridge disposed on the sidewalls;

a second end of the inner ridge disposed on the sidewalls; and a region of the sidewalls defined between the first end and the second end, wherein the respective receptacle of each of the first container and the second container is formed by their respective inner ridges and regions.

15. The assembly of claim 14, wherein each of the first container body and the second container body are trash cans, and wherein each of the first container and the second container include a receptacle formed by their respective inner ridges, said receptacle shaped to receive a roll of trash bags.

16. The assembly of claim 14, wherein each of the first container body and the second container body each include:

a first side of the sidewalls; and a second side of the sidewalls, wherein the respective first ends of each of the first container body and the second container body are disposed on the respective first sides of the first container body and the second container body, and wherein the respective second ends of each of the first container body and the second container body are disposed on the respective second sides of the first container body and the second container body.

17. The assembly of claim 16, wherein each of the first container body and the second container body include a corner formed between their respective first sides and second sides, wherein the respective portion of each of the first container body and the second container body extends across the respective corners of the first container body and the second container body, wherein each of the first container body and the second container body include a middle of the respective inner ridges of the first container body and the second container body, said inner ridges extending between the respective first end and second end of the first container body and the second container body, and wherein each of said middles are arcuate.

18. A container apparatus, comprising:

a container body including a top, a bottom, and sidewalls spanning between the top and the bottom, the bottom and sidewalls forming an interior face and an exterior face, such that an enclosure is defined within the interior face;

an inner ridge defined on the interior face at the bottom, the inner ridge including a hollow interior that forms an outer channel on the exterior face; and a receptacle formed by the inner ridge, wherein the sidewalls include a first side and a second side, and wherein the outer channel includes a first window on the first side, a second window on the second side, and a third window on the bottom.

* * * * *